US 9,004,104 B2

(12) United States Patent
Ungchusri et al.

(10) Patent No.: US 9,004,104 B2
(45) Date of Patent: Apr. 14, 2015

(54) MANIFOLD TRAILER WITH MULTIPLE ARTICULATING ARM ASSEMBLIES

(75) Inventors: Tep Ungchusri, The Woodlands, TX (US); William H. Garner, Houston, TX (US); Paul A. Crawford, Houston, TX (US); James R. Soltau, Stephenville, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 14/129,006

(22) PCT Filed: Jul. 8, 2011

(86) PCT No.: PCT/US2011/001194
§ 371 (c)(1),
(2), (4) Date: Apr. 28, 2014

(87) PCT Pub. No.: WO2013/009274
PCT Pub. Date: Jan. 17, 2013

(65) Prior Publication Data
US 2014/0231554 A1    Aug. 21, 2014

(51) Int. Cl.
*E03B 1/00* (2006.01)
*E21B 43/26* (2006.01)

(52) U.S. Cl.
CPC ........................ *E21B 43/26* (2013.01)

(58) Field of Classification Search
USPC .......................................... 137/615; 141/387
See application file for complete search history.

(56) References Cited

U.S. PATENT DOCUMENTS

| | | |
|---|---|---|
| 3,363,919 A | 1/1968 | Brazell, II |
| 3,750,749 A | 8/1973 | Giroux |
| 3,888,318 A | 6/1975 | Brown |
| 4,185,841 A | 1/1980 | Brundage |
| 4,226,447 A | 10/1980 | Brown |
| 4,355,784 A | 10/1982 | Cain |
| 4,570,673 A | 2/1986 | Kendrick et al. |
| 4,828,033 A | 5/1989 | Frison |
| 4,998,560 A * | 3/1991 | Le Devehat ............ 141/387 |
| 5,065,787 A | 11/1991 | Lochmann |
| 5,314,024 A * | 5/1994 | Rodgers et al. ............ 166/347 |
| 6,105,614 A | 8/2000 | Bohaychuk et al. |
| 6,367,546 B1 | 4/2002 | Mentesh et al. |
| 6,701,980 B2 * | 3/2004 | Rothrock ............ 137/615 |
| 6,892,818 B2 | 5/2005 | Mentesh et al. |
| 7,635,254 B2 | 12/2009 | Kunz et al. |

(Continued)

OTHER PUBLICATIONS

FMC Technologies, 2010 Annual Report, p. 12 (Apr. 2011), showing a manifold trailer with ten articulating frac arms.

*Primary Examiner* — Kevin Lee
(74) *Attorney, Agent, or Firm* — Henry C. Query, Jr.

(57) ABSTRACT

A manifold trailer comprises at least one main line having a plurality of discharge connectors and a plurality of articulating arm assemblies which are each connected to a corresponding discharge connector. Each arm assembly comprises a connector member which includes an inlet port, an outlet port and a third port which is located generally opposite the outlet port and is closed by a removable plug member. Each arm assembly also includes an articulating conduit assembly which comprises a first end that is connected to the inlet port and a riser swivel which is connected to the outlet port. During deployment of the arm assembly, a second end of the conduit assembly is connectable to a pumping unit to thereby fluidly connect the pumping unit to the main line.

34 Claims, 14 Drawing Sheets

(56) References Cited

U.S. PATENT DOCUMENTS

| | | |
|---|---|---|
| 2006/0090891 A1 | 5/2006 | McGuire et al. |
| 2007/0017586 A1 | 1/2007 | Bohaychuk |
| 2007/0029090 A1 | 2/2007 | Andreychuk et al. |
| 2009/0120635 A1 | 5/2009 | Neal |
| 2010/0193057 A1 | 8/2010 | Garner et al. |

* cited by examiner

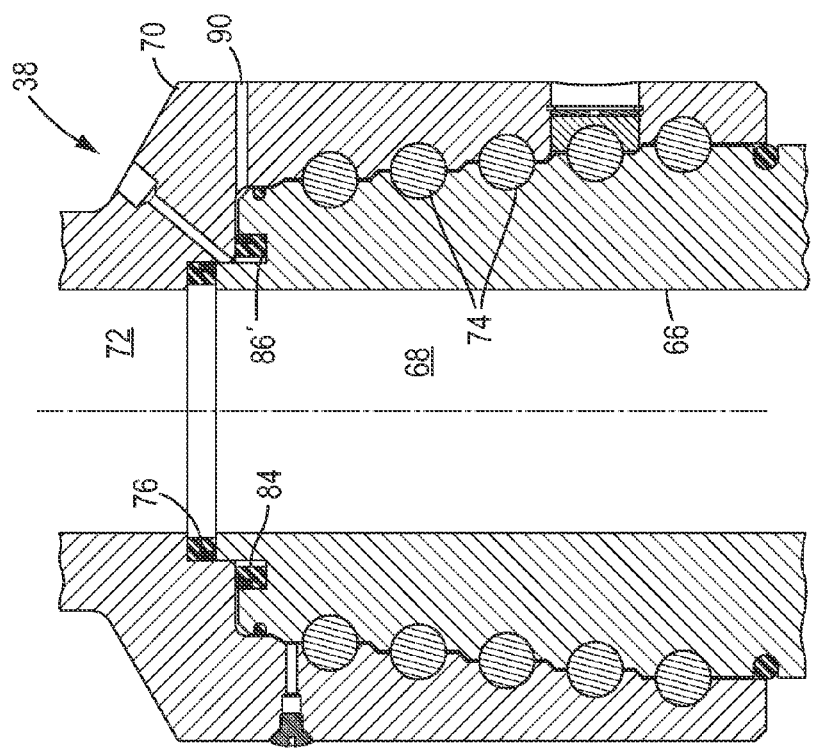
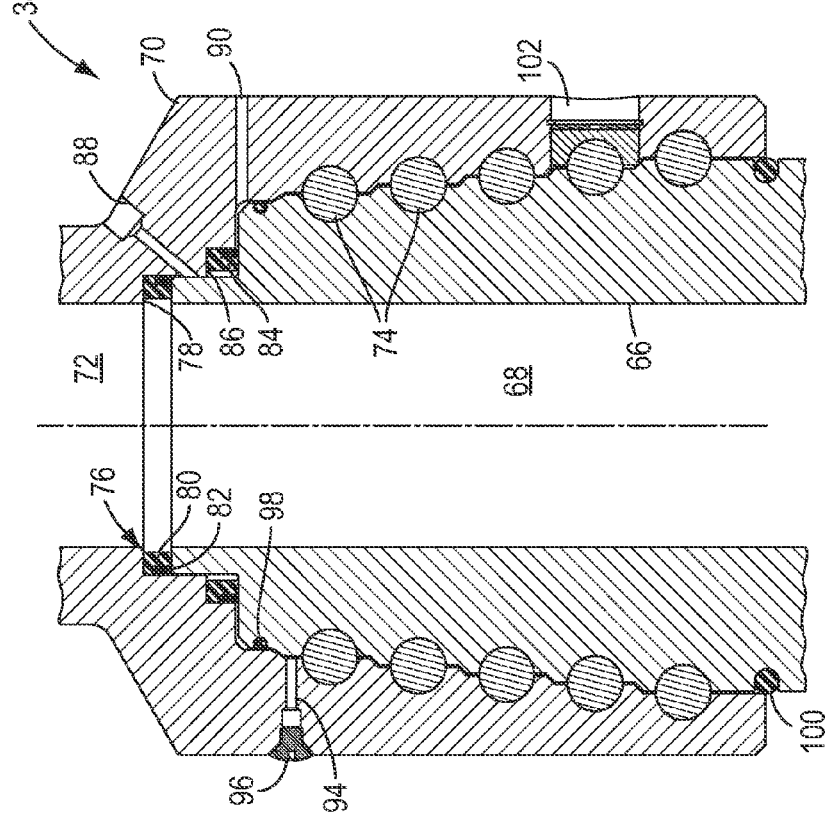
FIG. 4
FIG. 5

MANIFOLD TRAILER WITH MULTIPLE ARTICULATING ARM ASSEMBLIES

BACKGROUND OF THE INVENTION

The present invention is directed to a manifold trailer for connecting a plurality of pumping units to a main line which in turn is connectable to a wellhead or the like. More particularly, the invention is directed to a manifold trailer which comprises a plurality of articulating arm assemblies which are each connected to the main line and extendable for connection to respective pumping units.

High pressure well service pumping units are commonly used in the hydrocarbon production industry to inject a variety of fluids into an oil or gas well during certain well servicing operations. For example, during a fracturing operation such pumping units are used to inject a particle-containing slurry into the well in order to fracture the hydrocarbon bearing formation and thereby produce channels within the formation through which the oil or gas may flow.

Typical fracturing operations require the use of several pumping units operating in unison to inject a large volume of slurry into the well. The pumping units are mounted on respective trucks or trailers which are parked close together, and the discharge pipe assembly of each pumping unit is connected to the so called main line of a collection manifold which is located on a separate manifold trailer.

The connection between each pumping unit and the main line is usually made using a temporary flow line comprising a collection of individual and pre-assembled pipes and swivel joints which are secured together by clamps or connectors. The flow line components are stowed on the truck or trailer in compact configurations, and when the truck or trailer reaches the job site, they must be unfolded and assembled in order to extend the flow line to the main line. However, this operation is time consuming, especially when multiple pumping units must be connected to the main line.

Also, in order to provide adequate support for the flow line, a common practice is to run the flow line from the truck or trailer to the ground and then from the ground to the collection manifold. However, this requires that each flow line be made up of several swivel joints comprising multiple swivel connections. In addition, the parts of the flow line which rest on the ground can experience undue wear that may shorten the life of these components. Furthermore, the numerous components of the many flow lines create cramped and cluttered conditions in the area between the pumping units and the manifold trailer, which can be a safety hazard for persons assembling the flow lines.

Furthermore, each flow line is typically connected to choke in order to create a pressure drop in the fluid flowing through the flow line and reduce pressure pulsations in the main line resulting from operation of the pumping units. The choke usually includes a fixed orifice choke insert which is mounted in a choke housing. The choke housing is normally connected to an isolation valve which in turn is connected to the main line. Thus, if the choke insert needs to be replaced, the choke housing must usually be disconnected from both the flow line and the isolation valve. Also, creating a desired pressure drop over a single choke usually results in a large amount of erosion in the isolation valve.

SUMMARY OF THE INVENTION

According to the present invention, these and other limitations in the prior art are addressed by providing a manifold trailer which comprises at least one main line having a plurality of discharge connectors and a plurality of articulating arm assemblies which are each connected to a corresponding discharge connector. Each arm assembly comprises a connector member which includes at least an inlet port, an outlet port and a third port which is located generally opposite the outlet port and is closed by a removable plug member; an articulating conduit assembly which comprises a first end that is connected to the inlet port; and a riser swivel which is connected to the outlet port. During deployment of the arm assembly, a second end of the conduit assembly is connectable to a pumping unit to thereby fluidly connect the pumping unit to the main line.

In accordance with one embodiment of the invention, the third port is positioned vertically above the inlet and outlet ports. In this embodiment, the third port may be positioned vertically above the conduit assembly when the second end is connected to the pumping unit.

In accordance with another embodiment of the invention, each arm assembly also comprises a choke insert which is positioned in the outlet port and is removable through the third port. The choke insert may be positioned in a counterbore formed in the outlet port. Alternatively, the choke insert may be supported on a seal assembly which is positioned between the connector member and the riser swivel. In this embodiment, the seal assembly comprises a bushing which projects radially into the outlet port and on which the choke insert is supported.

In accordance with another embodiment of the invention, the choke insert extends through the third port to the plug member. The choke insert may include a transverse pull bar which is located proximate the plug member. Alternatively, the choke insert may be connected to the plug member.

In accordance with a further embodiment of the invention, the choke insert may include at least one inlet opening and the arm assembly may comprise means for aligning the inlet opening with the inlet port. The aligning means may comprise an alignment pin which is received in opposing holes in the plug member and the connector member when the inlet opening is aligned with the inlet port. Alternatively, the connector member may comprise a fourth port which is located generally opposite the inlet port and the aligning means may comprise a locator pin which is positioned in the fourth port and which includes an axial projection that is received in a corresponding hole in the choke insert when the inlet opening is aligned with the inlet port.

In accordance with yet another embodiment of the invention, the plug member comprises a blind nut and the choke insert comprises a radial flange which is trapped between the blind nut and an adjacent portion of the connector member to thereby secure the choke insert within the connector member. In this embodiment, the arm assembly may comprise a first seal which is positioned between the flange and the blind nut and a second seal which is positioned between the flange and the adjacent portion of the connector member. In an alternative embodiment, the plug member comprises a blind plug which extends into the choke insert and is secured to the connector member by a nut.

In accordance with still another embodiment of the invention, the connector member comprises a fourth port which is located generally opposite the inlet port and is closed by a removable plug member. In this embodiment, the connector member may be configured such that each of the inlet port and the fourth port is connectable to the conduit assembly. In addition, the arm assembly may comprise a choke insert which is positioned in the inlet port and is removable through the fourth port.

In accordance with a further embodiment of the invention, the choke insert includes a choke orifice which comprises an exit opening diameter at an end of the choke orifice adjacent the riser swivel; the riser swivel includes a male swivel part which comprises a male swivel bore and a female swivel part which comprises a female swivel bore; and the diameter of at least one of the male swivel bore and the female swivel bore increases from a first diameter approximately equal to the exit opening diameter to a second, larger diameter to thereby create a pressure drop in a fluid flowing through the riser swivel.

In accordance with another embodiment of the invention, the choke insert includes a choke orifice which comprises an exit opening diameter at an end of the choke orifice adjacent the riser swivel; the riser swivel includes a male swivel part which comprises a male swivel bore and a female swivel part which comprises a female swivel bore; the female swivel part is located adjacent the choke insert; the diameter of the female swivel bore increases from a first diameter approximately equal to the exit opening diameter to a second, larger diameter; and the diameter of the male swivel bore is approximately equal to the second diameter.

In accordance with a further embodiment of the invention, the choke insert includes a choke orifice which comprises an exit opening diameter at an end of the choke orifice adjacent the riser swivel; the riser swivel includes a male swivel part which comprises a male swivel bore and a female swivel part which comprises a female swivel bore; the female swivel part is located adjacent the choke insert; the diameter of the female swivel bore is approximately equal to the exit opening diameter; and the diameter of the male swivel bore increases from a first diameter approximately equal to the exit opening diameter to a second, larger diameter.

In accordance with another embodiment of the invention, the riser swivel is connected to an isolation valve which in turn is connected to the discharge connector. In addition, the choke insert includes a choke orifice which comprises an exit opening diameter at an end of the choke orifice adjacent the riser swivel; the riser swivel includes a male swivel part which comprises a male swivel bore and a female swivel part which comprises a female swivel bore; the diameter of the male swivel bore is approximately equal to the exit opening diameter; the diameter of the female swivel bore is approximately equal to the exit opening diameter; and the isolation valve includes a valve bore which comprises a diameter that increases from a first diameter approximately equal to the exit opening diameter to a second, larger diameter.

In accordance with yet another embodiment of the invention, the choke insert includes a choke orifice which comprises an exit opening diameter at an end of the choke orifice adjacent the riser swivel; the isolation valve includes a valve bore and a closure member which is positioned across the valve bore; the valve bore comprises a diameter which is larger than the exit opening diameter; and the closure member includes a closure member bore which comprises an orifice having a diameter which is approximately equal to the exit opening diameter.

The present invention will now be described with reference to the accompanying drawings. In the drawings, the same reference numbers may be used to denote similar components in the various embodiments.

BRIEF DESCRIPTION OF THE DRAWINGS

FIG. 3A is an enlarged cross sectional view of an embodiment of the seal assembly component of the articulating arm assembly of FIG. 3;

FIG. 4 is a cross sectional view of an embodiment of a riser swivel seal arrangement which is suitable for use in the articulating arm assembly of FIG. 3;

FIG. 5 is a cross sectional view of another embodiment of a riser swivel seal arrangement which is suitable for use in the articulating arm assembly of FIG. 3;

FIG. 7A is an enlarged cross sectional view of an embodiment of the seal assembly component of the articulating arm assembly of FIG. 7;

DETAILED DESCRIPTION OF THE INVENTION

Figure 1A:
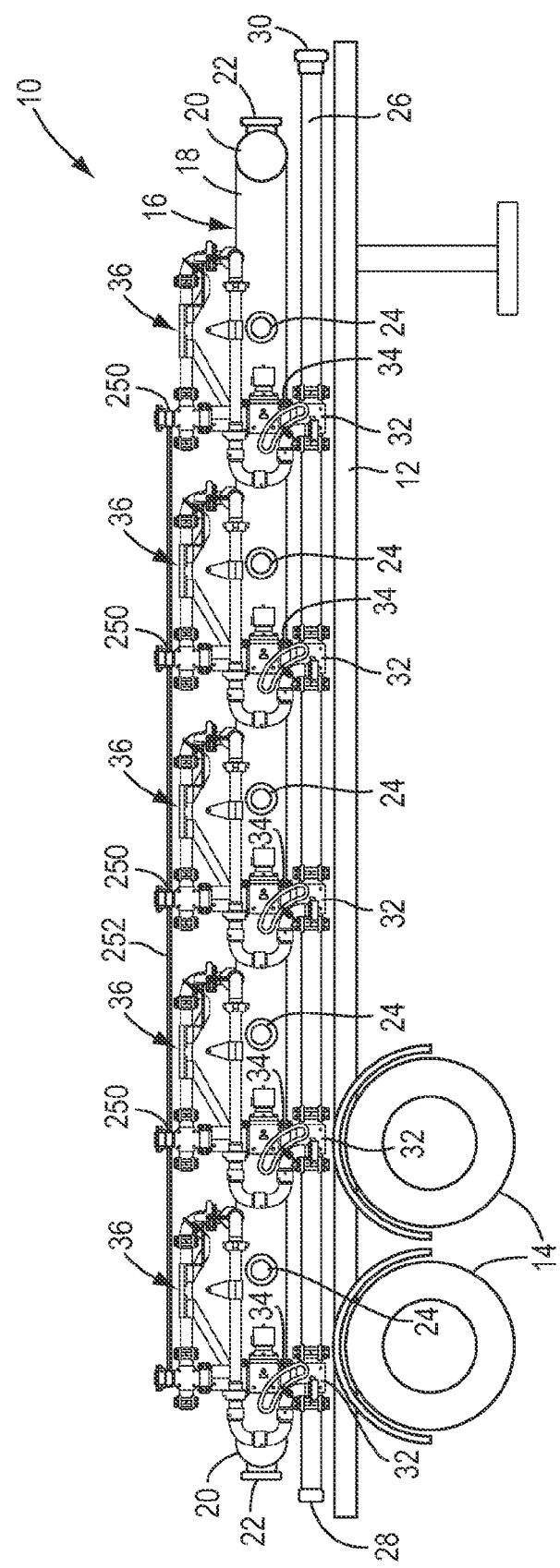
FIG. 1A is a side elevation view of an illustrative embodiment of the manifold trailer of the present invention.
Figure 1B:
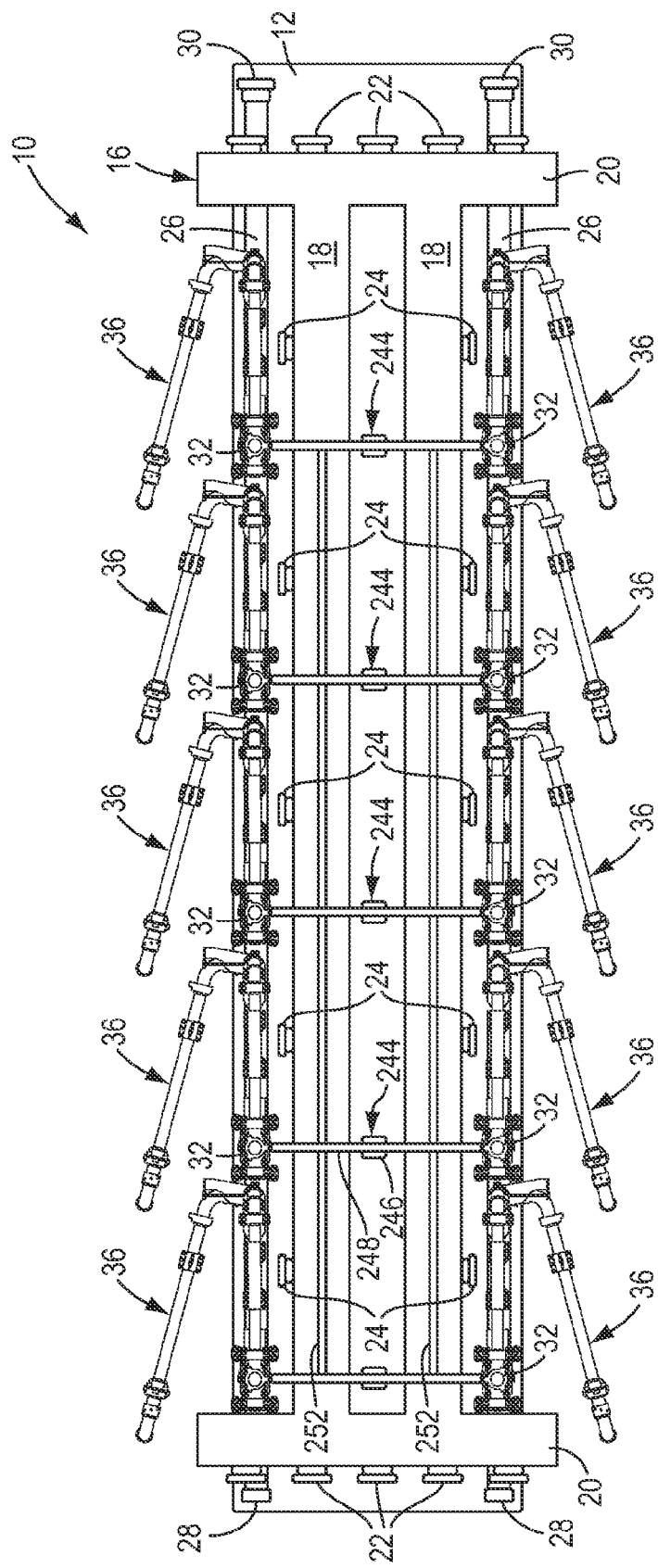
FIG. 1B is a top plan view of the manifold trailer of FIG. 1.

A manifold trailer in accordance with one embodiment of the present invention is shown in FIGS. 1A and 1B. The manifold trailer, generally 10, may be used in the oil and gas production industry to perform servicing operations on a well. For example, in a well fracturing operation the manifold trailer 10 may be used to inject a slurry into the wellbore in order to fracture the hydrocarbon bearing formation and thereby produce channels through which the oil or gas may flow. In this operation the manifold trailer 10 connects a slurry source to a number of high pressure pumping units and connects the high pressure pumping units to a wellhead mounted at the top of the wellbore. Thus, the manifold trailer eliminates the need to provide separate connections between the slurry source and each high pressure pumping unit and between each high pressure pumping unit and the wellhead.

As shown in FIGS. 1A and 1B, the manifold trailer 10 comprises a chassis 12 which is supported on a number of wheels 14 to allow the manifold trailer to be towed between various locations. An intake manifold assembly 16 is supported on the chassis 12 and includes one or more (e.g., two as shown in FIG. 1B) longitudinally extending intake pipes 18 which are fluidly connected at their adjacent ends by transverse end pipes 20. Each end pipe 20 includes a number of intake connectors 22 which are connectable to a slurry source, such as a blender or storage tank (not shown), by corresponding conduits (not shown). In addition, each intake pipe 18 includes a number of suction connectors 24 which are each connectable to the suction side of a corresponding high pressure pumping unit (not shown) by a respective conduit. Thus, the intake manifold assembly 16 connects the slurry source to each of the high pressure pumping units.

Referring still to FIGS. 1A and 1B, the manifold trailer 10 also includes one or more (e.g., two as shown in FIG. 1B) longitudinally extending main pipes or lines 26. One end of each main line 26 is closed by a cap or plug 28, while the other end is provided with one or more injection connectors 30 which are each connectable to a corresponding wellhead (not show) by a respective conduit (not shown). Each main line 26 comprises a number of straight pipe sections and optional elbows (not shown) which are connected together by T connectors 32. The branch of each T connector 32 defines a discharge connector 34 which is connectable to the discharge side of a corresponding high pressure pumping unit by means which will be described below. In the exemplary embodiment of the invention shown in FIG. 1, each main line 26 comprises five T connectors 32 and thus five discharge connectors 34. As a result, each main line 26 is capable of connecting up to five high pressure pumping units to a corresponding wellhead.

In accordance with the present invention, some or all of the discharge connectors 34 are connected to corresponding high pressure pumping units by respective articulating arm assemblies 36. In the embodiment of the invention shown in FIGS. 1A and 1B, wherein each of the two main lines 26 is provided with five discharge connectors 34, the manifold trailer 10 may comprise ten arm assemblies 36, each of which connects an associated discharge connector to the discharge side of a corresponding high pressure pumping unit.

Figure 2:
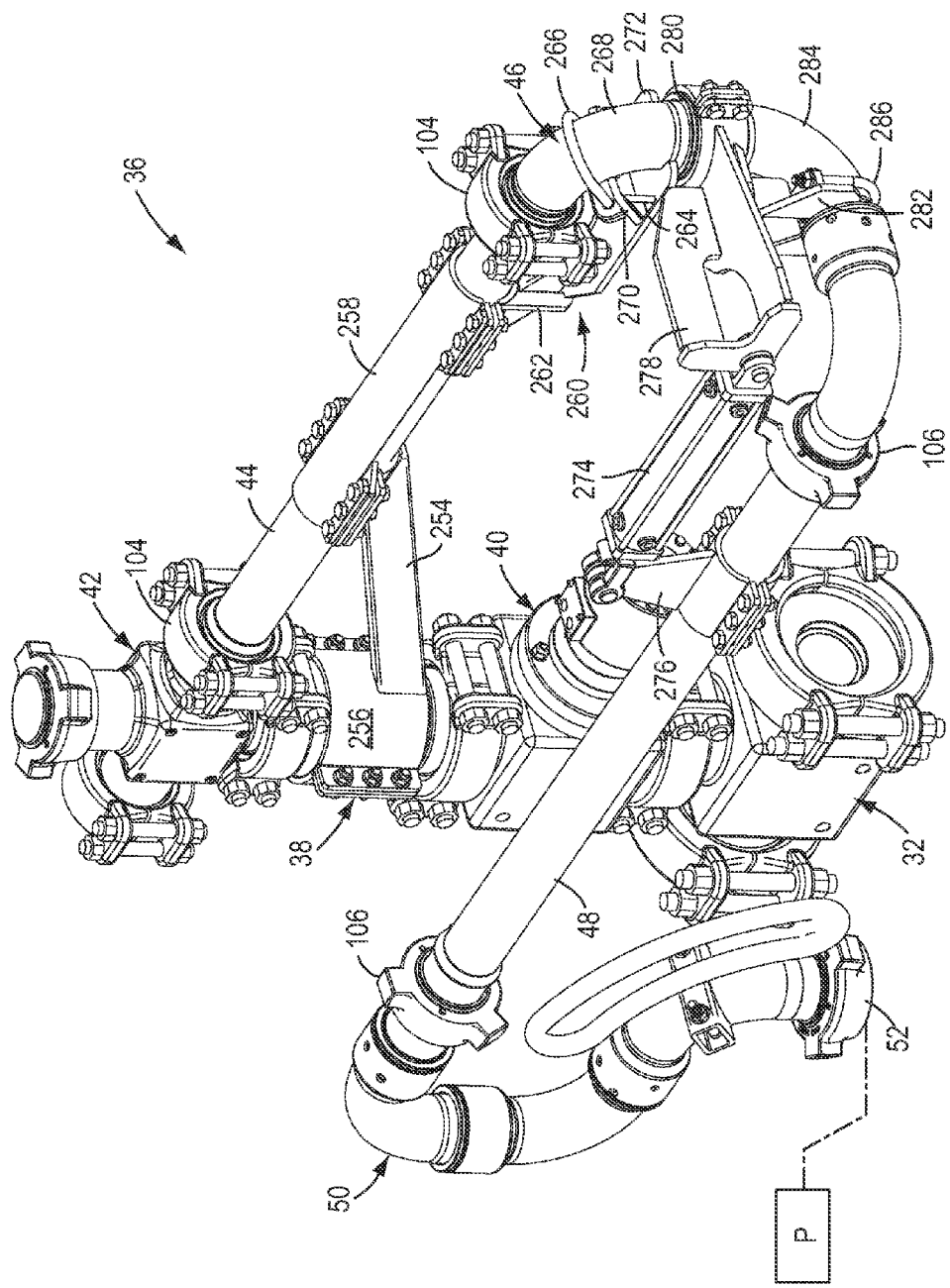
FIG. 2 is a perspective view of one embodiment of an articulating arm assembly which is suitable for use as part of the manifold trailer of FIG. 1.
Figure 3:
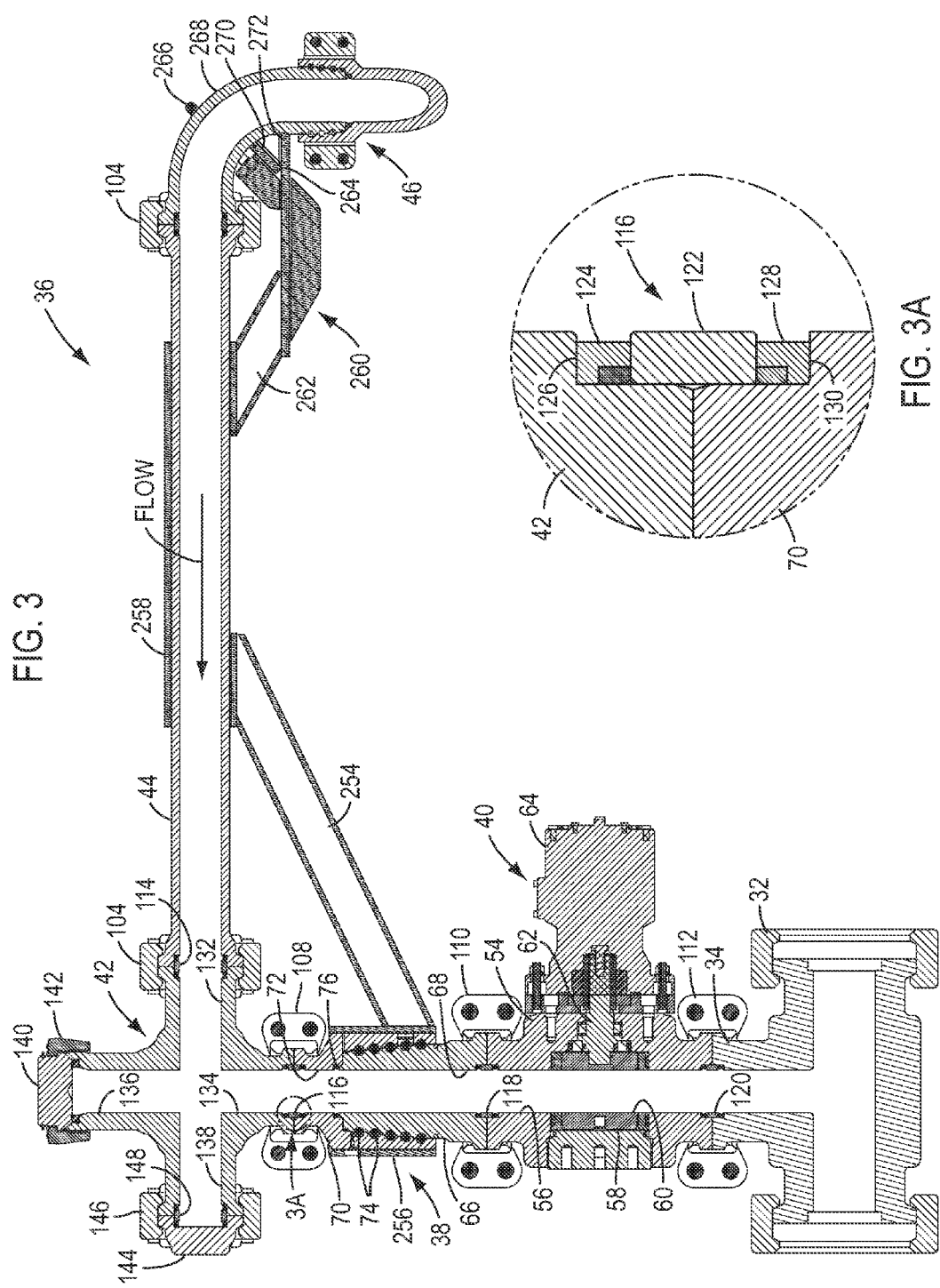
FIG. 3 is a cross sectional view of the articulating arm assembly of FIG. 2 shown mounted on a T connector.

Referring to FIGS. 2 and 3, each arm assembly 36 includes a riser swivel 38 which is connected to an isolation valve 40 that in turn is connected to the T connector 32, a connector member, such as a four-port cross connector 42, which is connected to the top of the riser swivel, and an articulating conduit assembly which is connected to the cross connector. The conduit assembly includes a generally horizontal inner arm 44 which is connected to the cross connector, a first swivel joint 46 which is connected to the distal end of the inner arm, an outer arm 48 which is connected to the distal end of the first swivel joint, a second swivel joint 50 which is connected to the distal end of the outer arm, and an end connector 52 which is connected to the distal end of the second swivel joint and is connectable to a pumping unit P.

As shown best in FIG. 3, the isolation valve 40 may comprise a standard plug valve which includes a valve body 54 through which a valve bore 56 extends, a closure member in the form of a plug member 58 which includes a plug bore 60 that aligns with the valve bore when the isolation valve is in the open position, a rotatable stem 62 which is connected to the plug member, and an actuator 64 which is connected to the valve body over the stem. Alternatively, a handwheel or other manual actuation device (not shown) may be coupled to the stem instead of the actuator 64. In operation, the actuator 64 rotates the stem 62 to thereby move the plug member 58 between the open position shown in FIG. 3 and a closed position in which the plug bore 60 is offset from the valve bore 56. A suitable isolation valve 40 for use with the present invention is the Model 3 inch 15 k ULT plug valve made by FMC Technologies, Inc. of Houston, Tex.

Referring still to FIG. 3, the riser swivel 38 comprises a male swivel part 66 through which a male swivel bore 68 extends and a female swivel part 70 through which a female swivel bore 72 extends. The male swivel part 66 is received in the female swivel part 70 and is rotatably connected thereto in a conventional fashion, such as with a plurality of balls 74. At least one primary seal member 76 is positioned between the male swivel part 66 and the female swivel part 70 to thereby provide a continuous sealed flow path between the male swivel bore 68 and the female swivel bore 72.

Referring also to FIG. 4, the primary seal member 76, which is shown positioned in an annular seal pocket 78 formed in the female swivel part 70, may comprise a face type ring seal 80 having a generally rectangular or slightly trapezoidal cross section and an anti-extrusion ring 82 which is positioned in a corner of the ring seal. The ring seal 80 and anti-extrusion ring 82 may be made of any appropriate materials, such as nitrile elastomer and brass, respectively. An example of a primary seal member 76 which is suitable for use in the riser swivel 38 is the TripleStep Instream packing made by FMC Technologies, Inc.

Referring still to FIG. 4, in addition to the first primary seal member 76, the riser swivel 38 may be provided with a second primary seal member 84. The second primary seal member 84, which may be of the same construction as the first primary seal member 76, is positioned between the male swivel part 66 and the female swivel part 70 downstream of the first primary seal member (where the term "downstream" is in reference to a potential leak path from the male and female swivel bores 68, 72 to the exterior of the riser swivel 38). As shown in FIG. 4, the second primary seal member 84 may be disposed in an annular seal pocket 86 which is formed in the female swivel part 70. Alternatively, the second primary seal member 84 may as shown in FIG. 5 be positioned in an annular seal pocket 86' which is formed in the male swivel part 66.

The second primary seal member 84 ideally comprises the same or a similar pressure rating as the first primary seal member 76. Accordingly, the second primary seal member 84 will enable the riser swivel 38 to remain in service under normal operating conditions even if the first primary seal member 76 develops a leak. In this regard, the operator may monitor the sealing integrity of the first primary seal member 76 and, if a leak is detected, continue operating the arm assembly 36 until a leak is detected in the second primary seal member 84. Thus, the use of the first primary seal 76 and the second primary seal 84 is superior to the use in the prior art of a primary seal and a secondary or backup seal since in the latter arrangement the secondary seal is normally designed to retain pressure only temporarily until the riser swivel can be removed from service if a leak is detected in the primary seal.

The sealing integrity of the first primary seal member 76 may be monitored through a first leak detection port 88 which extends to between the first and second primary seal members 76, 84. Likewise, the sealing integrity of the second primary seal member 84 may be monitored through a second leak detection port 90 which extends to between the second primary seal member 84 and the balls 74. The second leak detection port 90 may also be used to inject a corrosion inhibitor onto the second primary seal member 84. Also shown in FIG. 4 are a number of conventional swivel components, including a grease injection port 94 which is closed by a cap screw 96, an upper grease seal 98, a lower grease seal 100, and a ball port 102.

Referring again to FIG. 3, the cross connector 42 may be connected to the inner arm 44 and the inner arm may be connected to the first swivel joint 46 by suitable first connectors 104. Also, the first swivel joint 46 may be connected to the outer arm 48 and the outer arm may be connected to the second swivel joint 50 by suitable second connectors 106. In addition, the cross connector 42 may be connected to the female swivel part 70 by a third connector 108, the male swivel part 66 may be connected to the isolation valve 40 by a fourth connector 110, and the isolation valve may be connected to the discharge connector 34 (which in this case is defined by the branch of the T connector 32) by a fifth connector 112. Each of the connectors 104 and 108-112 may comprise, for example, conventional clamp-type connectors, while the second connectors 106 may comprise, e.g., hammer unions.

Referring still to FIG. 3, the inner arm 44 is sealed to the cross connector 42 by a first seal assembly 114, the cross connector is sealed to the female swivel part 70 by a second seal assembly 116, the male swivel part 66 is sealed to the isolation valve 40 by a third seal assembly 118, and the isolation valve is sealed to the discharge connector 34 (i.e., the branch of the T connector 32) by a fourth seal assembly 120. In the embodiment of the invention shown in FIG. 3, the seal assemblies at clamp locations 114-120 and 148 are identical. Therefore, these seal assemblies may be described with reference to FIG. 3A, which is an enlarged view of the second seal assembly 116. As shown in FIG. 3A, the second seal assembly 116 comprises a bushing 122 which comprises a generally rectangular cross section, a first ring seal 124 which is positioned between the bushing and a recessed seal pocket 126 that is formed in the cross connector 42, and a second ring seal 128 which is positioned between the bushing and a recessed seal pocket 130 that is formed in the female swivel part 70. The first and second ring seals 124, 128 may comprise face-type ring seals similar to the seal member 76 described above. The bushing 122 may be made of any suitable material, such as alloy steel.

Referring again to FIG. 3, the cross connector 42 includes an inlet port 132 which is fluidly connected to the inner arm 44, an outlet port 134 which is fluidly connected to the female swivel bore 72, a top port 136 and a side port 138. The top port 136 is closed by a top plug 140 which is secured to the cross connector 42 by, e.g., a wing union nut 142. In accordance with the present invention, the top port 136 is located vertically above the inlet port 132, the inner arm 44, the first swivel joint 46, the outer arm 48 and the second swivel joint 50. As a result, the top port 136 provides the highest access point to the flow bore extending through the arm assembly 36. Thus, when the arm assembly 136 is being pressurized, for example during hydrostatic pressure tests, the top plug 140 can be opened to bleed off any air which may be trapped in the arm assembly. In addition, the top port 136 provides access for installation of a choke insert in the outlet port 134 without having to disconnect the cross connector 42 from either the inner arm 44 or the riser swivel 38.

The side port 138 is closed by a side plug 144 which is secured to the cross connector 42 by, e.g., a clamp-type connector 146 and is sealed to the cross connector by a side port seal assembly 148. In accordance with the present invention, the side port 138 may function as, e.g., an inspection port, a pump priming port, an access for a horizontal choke insert and/or a flow cushioning chamber.

Also, in one embodiment of the invention the cross connector 42 is ideally configured so that the same or similar connectors may be used for the connectors 104, 146 and the same or similar seal assemblies may be used for the seal assemblies 114, 148. This will enable the cross connector 42 to be oriented such that either the inlet port 132 or the side port 138 is connected to the inner arm 44. In this manner, in the event the inlet port 132 reaches its erosion limit, the cross connector 42 can be re-installed with the side port 138 connected to the inner arm 44 to thereby substantially extend the life of the cross connector.

Figure 6:
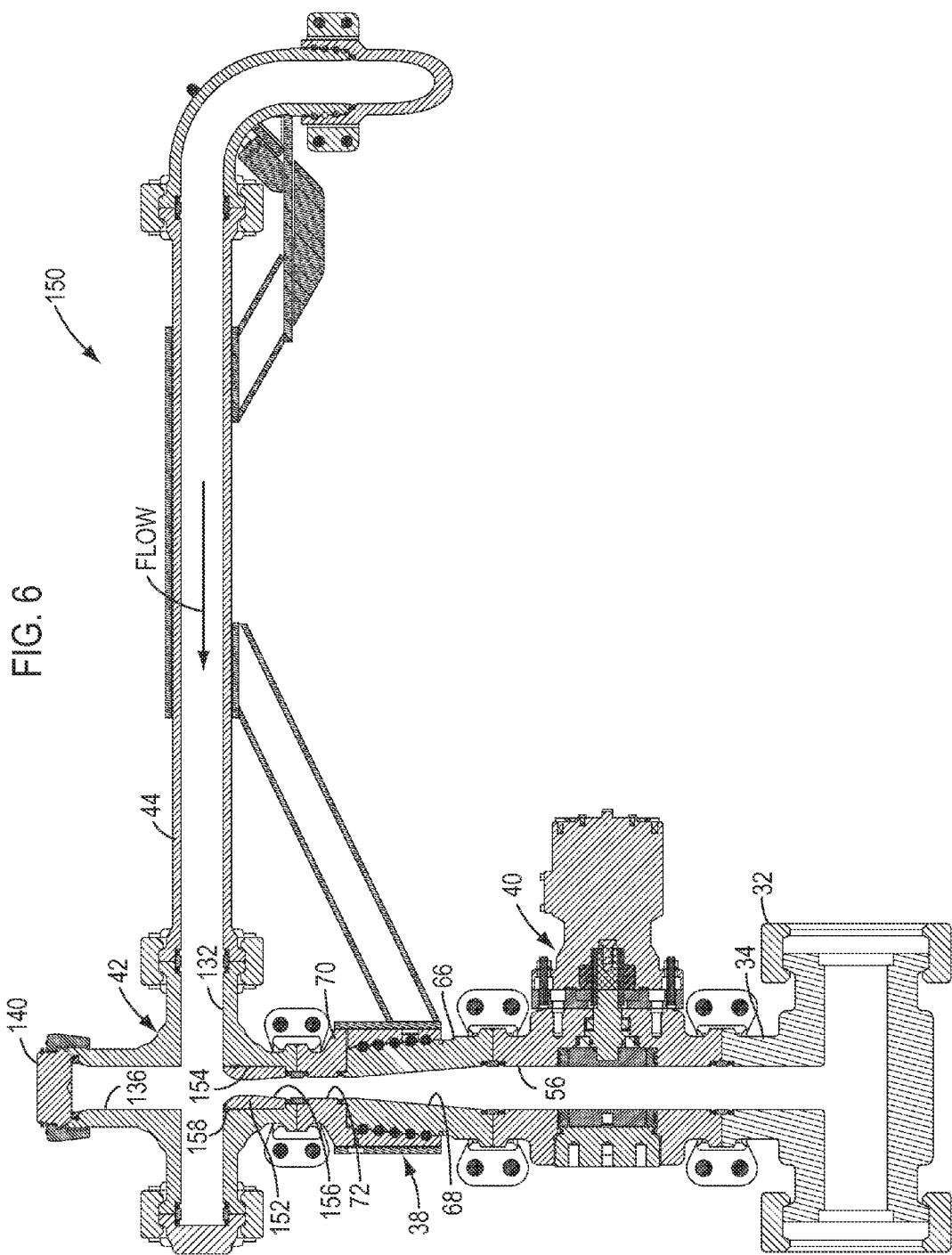
FIG. 6 is a cross sectional view of a second embodiment of an articulating arm assembly which is suitable for use as part of the manifold trailer of FIG. 1.

A second embodiment of the arm assembly of the present invention is shown in FIG. 6. The arm assembly of this embodiment, generally 150, is similar in many respects to the arm assembly 36 described above. Therefore, only those features of the arm assembly 150 which are different from those of the arm assembly 36 will be described.

As shown in FIG. 6, the arm assembly 150 comprises a fixed orifice choke insert 152 which is positioned in a counterbore 154 formed in the outlet port 134 of the cross connector 42 and comprises a choke orifice 156 that communicates with the inlet opening 132. The choke insert 152 may be retained in position in the counterbore 154 by any suitable means, such as a snap ring 158 which is received in a corresponding groove formed in the counterbore above the choke insert. The choke insert 152 may be removed and replaced through the top port 136 of the cross connector 42 by simply removing the top plug 140. Therefore, the cross connector 42 does not need to be disconnected from the riser swivel 38 and/or the inner arm 44 in order to replace the choke insert 152.

As is known in the art, the choke insert 152 acts to reduce the pressure of the fluid flowing through the arm assembly 150 and to dampen pressure pulsations in the main line 26. However, effecting a desired pressure drop over a single choke insert 152 may result in a high degree of erosion in portions of the arm assembly 150 located downstream of the choke insert.

In accordance with the present invention, the riser swivel 38 is configured to produce an additional pressure drop downstream of the choke insert 152. As a result of this arrangement, a larger orifice choke insert 152 may be used and the erosion caused by a large pressure drop over a single choke may accordingly be decreased. As shown in FIG. 6, the riser swivel 38 is configured to produce the second pressure drop by reducing the diameter of the female swivel bore 72 and then gradually increasing the diameter of the male swivel bore 68 until it is approximately the same as the diameter of the plug bore 56. For example, the diameter of the female swivel bore 72 may be approximately equal to the diameter of the choke orifice 156 at the exit end of the choke insert 152, the diameter of the upstream end of the male swivel bore 68 may be approximately equal to the diameter of the female swivel bore, the diameter of the downstream end of the male swivel bore may be approximately equal to the diameter of the valve bore 56, and the diameter of the male swivel bore may increase generally linearly from its upstream end to its downstream end. In this manner, the desired pressure drop will occur over the choke insert 152 and the male swivel bore 68.

Figure 7:
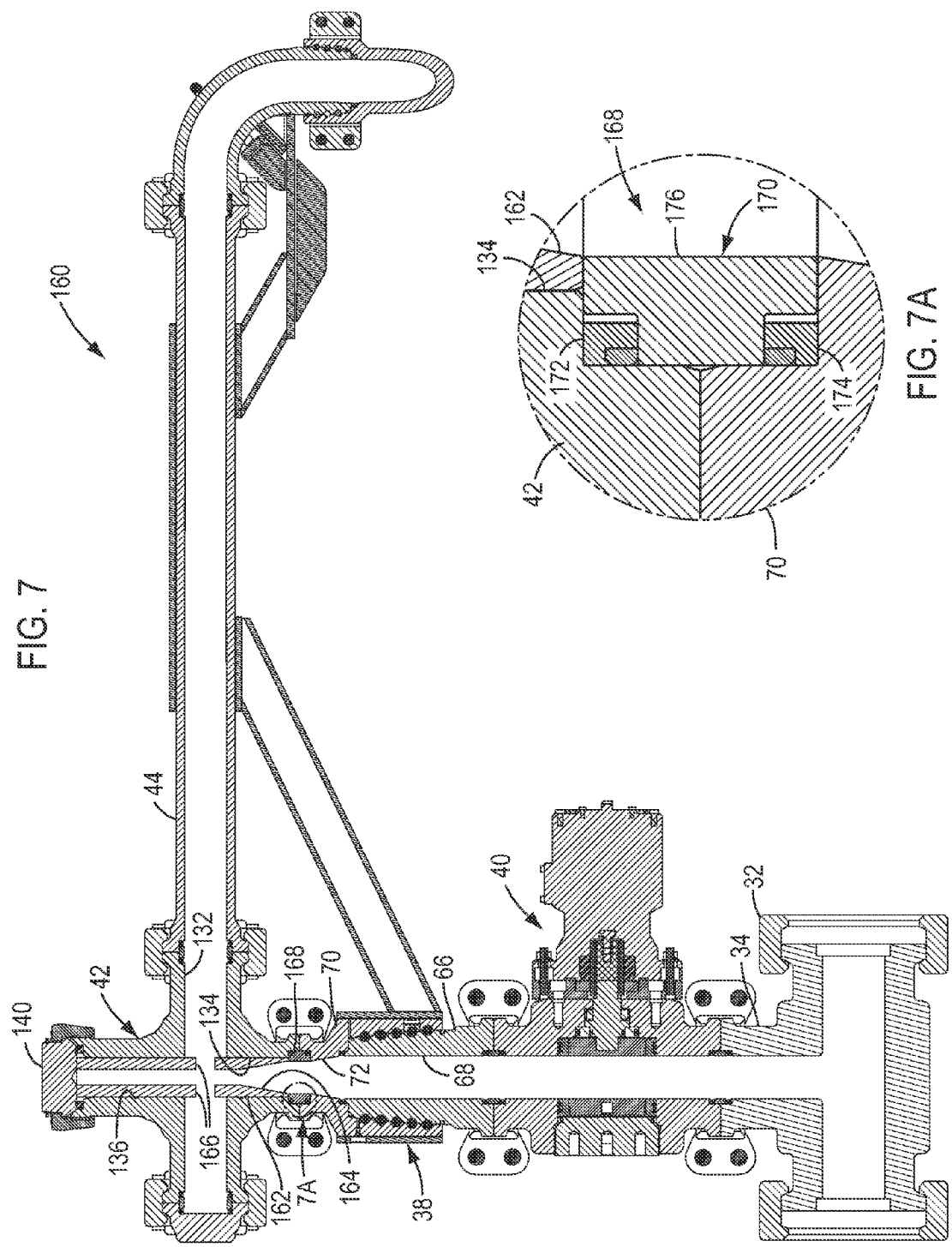
FIG. 7 is a cross sectional view of a third embodiment of an articulating arm assembly which is suitable for use as part of the manifold trailer of FIG. 1.

A third embodiment of the arm assembly of the present invention is shown in FIG. 7. The arm assembly of this embodiment, generally 160, comprises a fixed orifice choke insert 162 which is positioned in the outlet port 134 of the cross connector 42 and includes a choke orifice 164 which communicates with the inlet port 132 via a number of inlet openings 166. The choke insert 162 extends to approximately the top of the top port 136 and is therefore easily accessible by simply removing the plug 140.

In this embodiment, the choke insert 162 supported on a seal assembly 168 which is positioned between the cross connector 42 and the female swivel part 70 and is retained in position by the plug 140. Referring to FIG. 7A, the seal assembly 168 is similar to the seal assembly 116 described above in that it comprises a bushing 170, a first ring seal 172 which is engaged between the cross connector 42 and the bushing, and a second ring seal 174 which is engaged between the female swivel part 70 and the bushing. The first and second ring seals 172, 174 may be similar to the ring seals 124, 128 of the seal assembly 116, and the bushing 170 may be made of the same material as the bushing 122. In this embodiment, however, the bushing 170 comprises a preferably integral support ring 176 which projects radially into the outlet port 134 and thereby provides a support for the bottom of the choke insert 162.

As in the previous embodiment, the riser swivel 38 is configured to produce a second pressure drop in the fluid flowing through the arm assembly 160. As shown in FIG. 7, the riser swivel 38 is so configured by reducing the diameter of the upstream end of the female swivel bore 72 and then gradually increasing the diameter of the female swivel bore until the diameter of the downstream end of the female swivel bore is approximately the same as the diameter of the male swivel bore 68. For example, the diameter of the upstream end of the female swivel bore 72 may be approximately equal to the diameter of the choke orifice 164 at the exit end of the choke insert 162, the diameter of the downstream end of the female swivel bore 72 may be approximately equal to the diameter of the male swivel bore 68, and the diameter of the female swivel bore may increase generally linearly from its upstream end to its downstream end. In this manner, the desired pressure drop through the arm assembly 160 will occur over the choke insert 162 and the female swivel bore 72.

Figure 8:
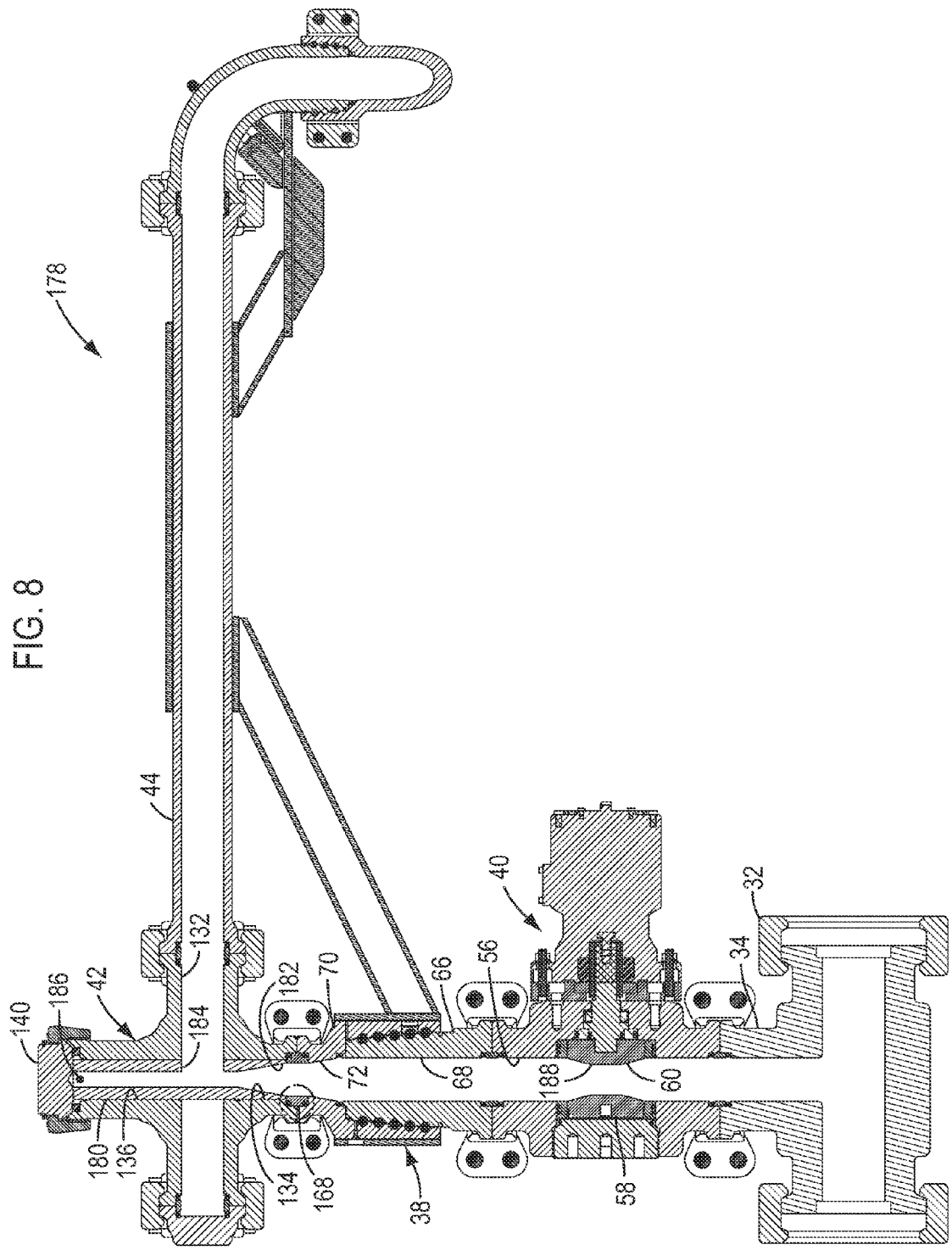
FIG. 8 is a cross sectional view of another embodiment of an articulating arm assembly which is suitable for use as part of the manifold trailer of FIG. 1.

A fourth embodiment of the arm assembly of the present invention is shown in FIG. 8. The arm assembly of this embodiment, generally 178, comprises a fixed orifice choke insert 180 which is positioned in the outlet port 134 of the cross connector 42 and includes a choke orifice 182 that communicates with the inlet opening 132 via a single inlet opening 184. The choke insert 180 extends to approximately the top of the top port 136 and includes a pull bar 186 which extends transversely across an upper end portion of the choke insert to facilitate removal and orientation of the choke insert.

In the embodiment of the invention shown in FIG. 8, the female swivel bore 72 is configured as described above in connection with FIG. 7 in order to produce a second pressure drop in the fluid flowing through the arm assembly 178. In addition, the isolation valve 140 is configured to produce a third pressure drop by modifying the plug bore 60 to include a plug orifice 188. The plug orifice 188 comprises a diameter smaller than the diameter of the valve bore 56. In a preferred embodiment of the invention, the plug orifice 188 comprises a diameter approximately equal to the diameter of the choke orifice 182 at the exit end of the choke insert 180. Thus, the desired pressure drop through the arm assembly 178 will occur over the choke insert 180, the female swivel bore 72 and the plug member 58. Moreover, the pressure drop across the plug member 58 will reduce the erosion rate of the plug member.

Figure 9:
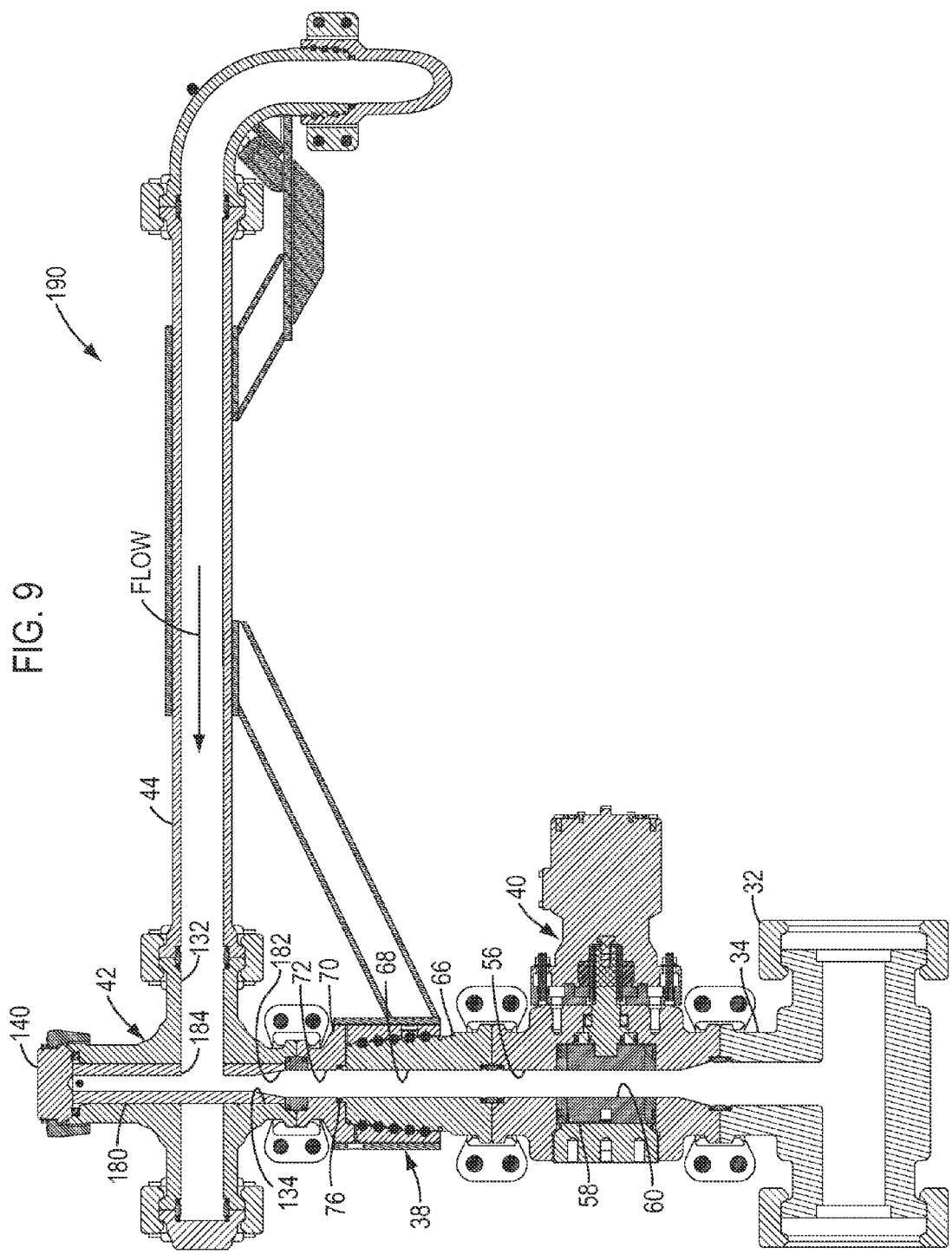
FIG. 9 is a cross sectional view of yet another embodiment of an articulating arm assembly which is suitable for use as part of the manifold trailer of FIG. 1.

Another embodiment of the arm assembly of the present invention is shown in FIG. 9. The arm assembly of this embodiment, generally 190, is similar to the arm assembly 178 discussed above. However, in this embodiment the plug bore 60, the portion of the valve bore 56 located above the plug member 58, the male swivel bore 68 and the female swivel bore 72 ideally all comprise approximately the same diameter as the choke orifice 182 at the exit end of the choke insert 180. This allows the use of a smaller primary seal member 76 for the riser swivel 38, which in turn reduces the hydrostatic force acting between the male swivel part 66 and the female swivel part 70. In addition, the second pressure drop across the arm assembly 190 is produced by increasing the diameter of the portion of the valve bore 56 located below the plug member 58 to match the diameter of the T connector 32.

Several alternative features for the above-described embodiments will now be described with reference to FIGS. 10-18.

Figure 10:
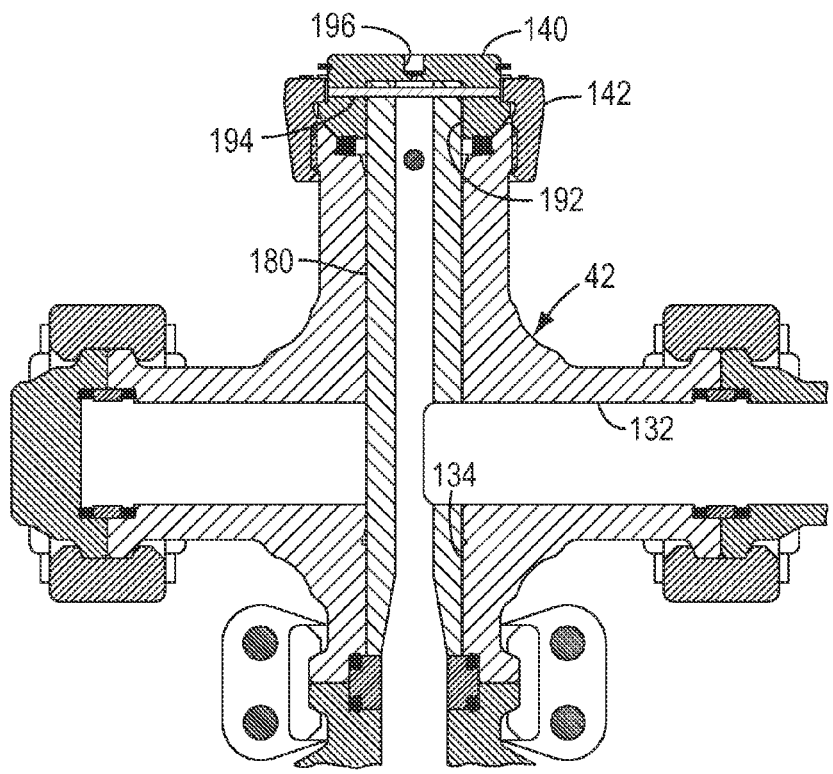
FIGS. 10-18 are cross sectional views of the cross connector component of the articulating arm assembly of the present invention showing alternative embodiments for mounting and orienting the choke insert component of the invention.

In the embodiment shown in FIG. 10 the upper end of the choke insert 180 is received in a recess 192 which is formed in the plug 140 and is secured thereto with a transverse pin 194. Thus, the choke insert 180 may be removed from the cross connector 42 by simply disconnecting the wing union nut 142 and removing the plug 140. The plug 140 may also be provided with a pressure test port 196.

Figure 11:
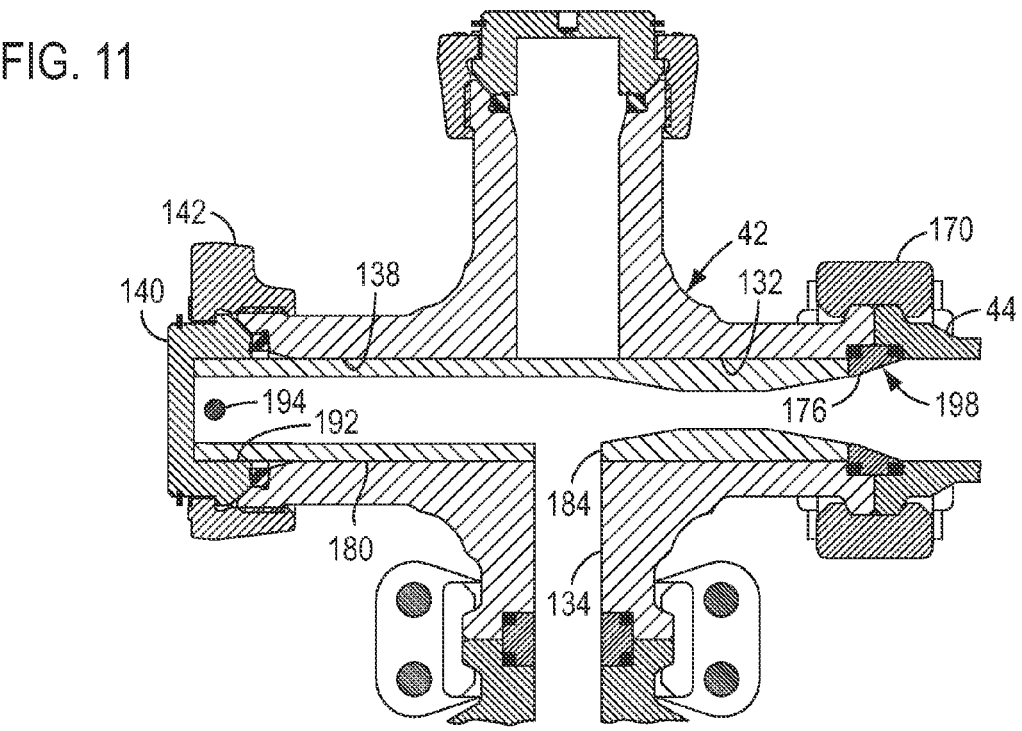

In the embodiment shown in FIG. 11, the choke insert 180 is positioned in the inlet port 132 of the cross connector with the side opening 184 in alignment with the outlet port 134. The top or left end (as viewed in FIG. 11) of the choke insert 180 extends through the side port 138 and, as with the FIG. 10 embodiment, is received in the recess 192 and secured to the plug 140 with the pin 194. In this embodiment, the bottom or right end of the choke insert 180 is retained by a seal assembly 198 which is positioned between the inner arm 44 and the cross connector 42. The seal assembly 198, which is similar to the seal assembly 168 described above, includes a bushing 170 having a support ring 176 which is engaged by the bottom or right end of the choke insert 180.

Figure 12:
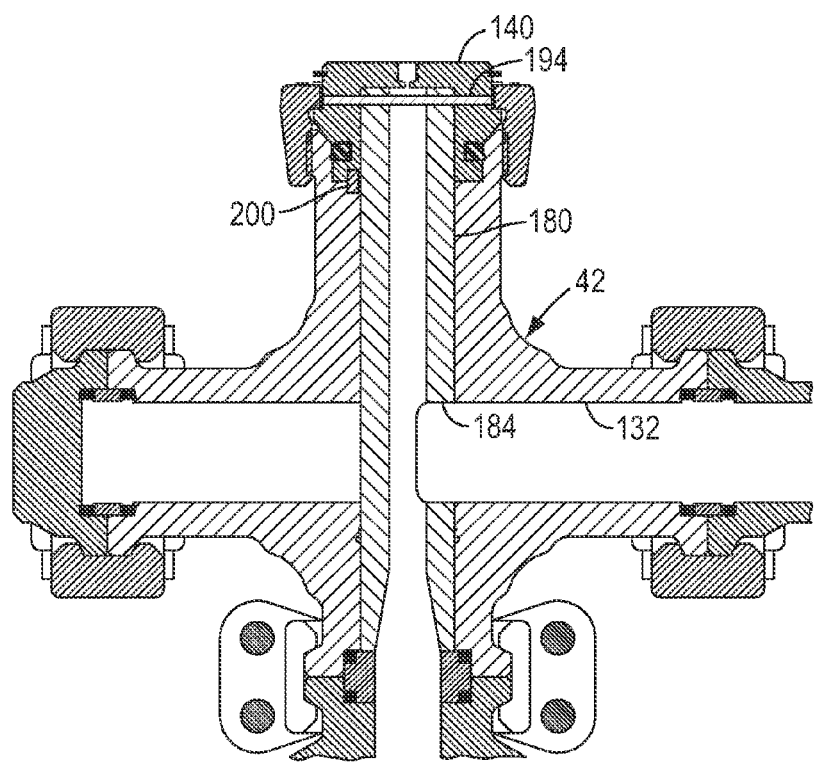

The embodiment shown in FIG. 12 is similar to that shown in FIG. 10. However, in the FIG. 12 embodiment a locator pin 200 is provided to aid in orienting the choke insert 180 relative to the cross connector 42. In particular, the top of the locator pin 200 is received in a corresponding hole in the plug 140 and, when the side opening 184 is aligned with the inlet port 132, the bottom end of the locator pin is received in a corresponding hole in the cross connector 42.

Figure 13:
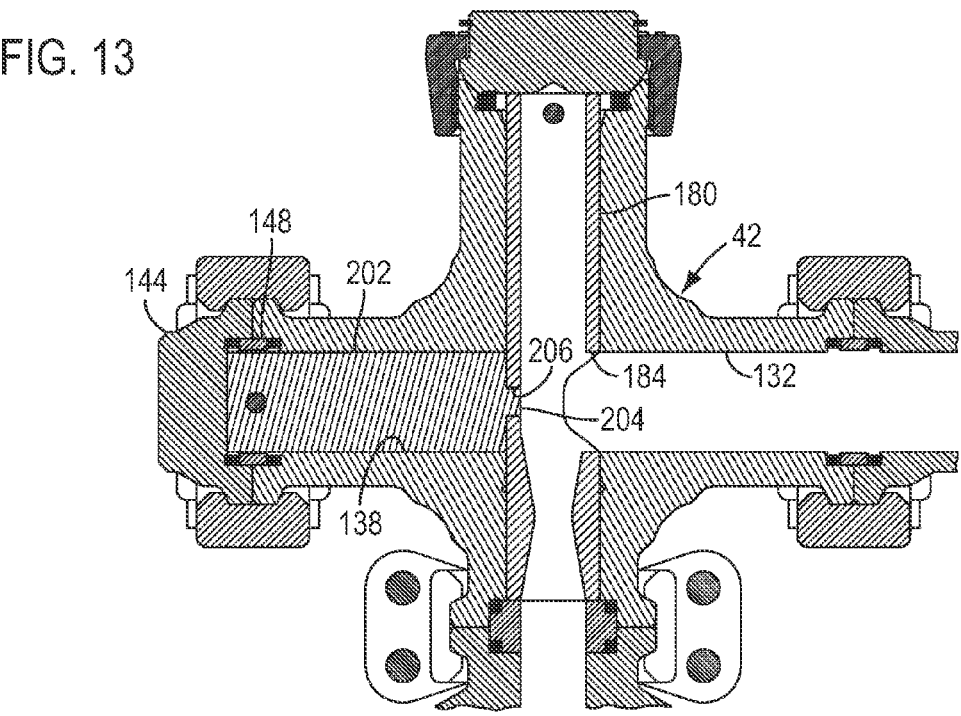

FIG. 13 illustrates another means for orienting the choke insert 180 relative to the inlet port 132 of the cross connector 42. In this embodiment a locator pin 202 comprising a small diameter axial projection 204 is positioned in the side port 138 of the cross connector 42. When the side opening 184 is properly oriented with the inlet port 132, the projection 204 is received in a corresponding hole 206 in the choke insert 180. As with the embodiment shown in FIG. 3, the side port 138 is closed by a plug 144 which is sealed to the cross connector with a seal assembly 148.

Figure 14:
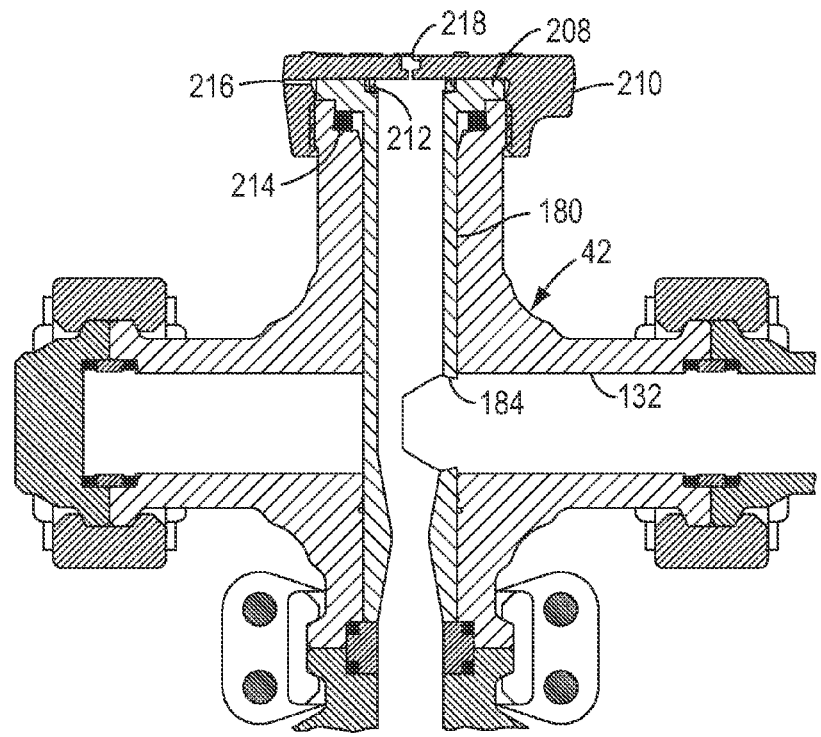

In the embodiment shown in FIG. 14, the choke insert 180 comprises an upper flange which is trapped between a blind wing union nut 210 and an adjacent portion of the cross connector 42. An upper seal 212 is positioned between the upper flange 208 and the wing union nut 210 and a lower seal 214 is positioned between the upper flange and the cross connector 42. The upper and lower seals 212, 214 may be similar to the seal member 76 described above. In addition, the wing union nut 210 may comprise a vent port 216 to release trapped pressure and a pressure test port 218.

Figure 15:
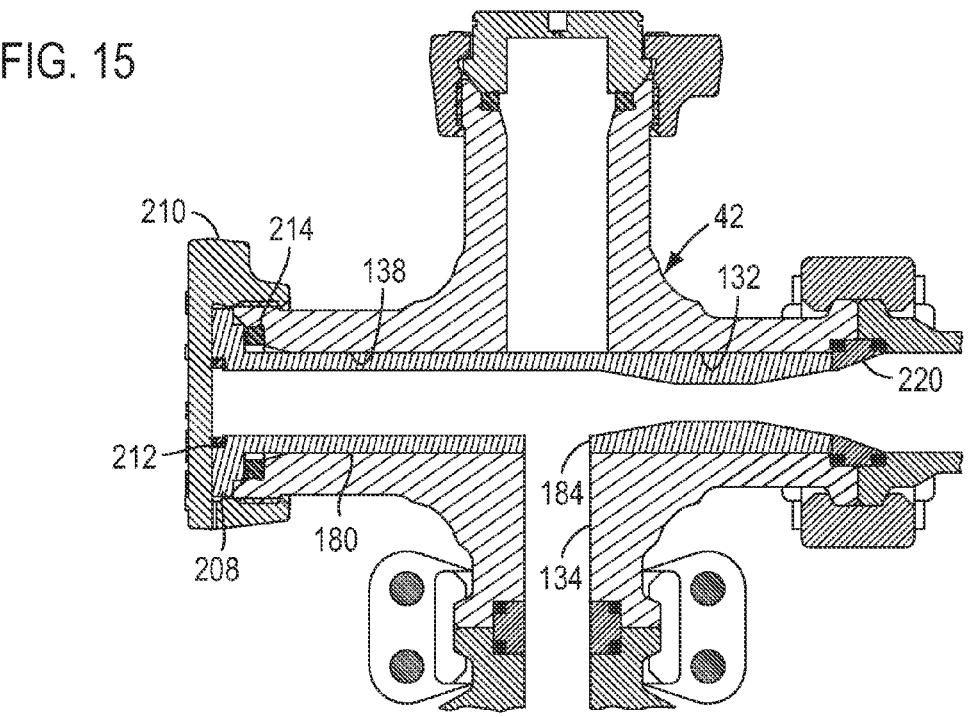

The embodiment shown in FIG. 15 is similar to that shown in FIG. 14. However, in this embodiment the choke insert 180 is positioned in the inlet port 132 with the side opening 184 in alignment with the outlet port 134 and the flange 208 positioned at the opening of the side port 138. In addition, the bottom or right end of the choke insert 180 is retained by a seal assembly 220 similar to the seal assembly 198 described above in connection with FIG. 11.

Figure 16:
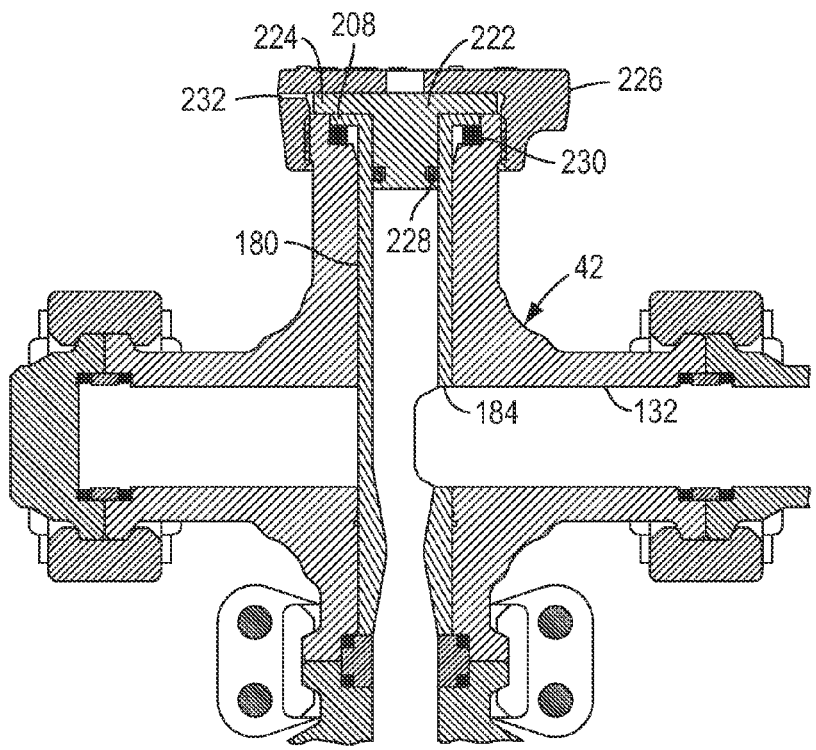

In the embodiment shown in FIG. 16, a blind plug 222 is provided which extends into the top of the choke insert 180. The blind plug 222 includes a rim 224 which is secured against both the flange 208 of the choke insert 180 and an adjacent portion of the cross connector 42 by a blind wing union nut 226. An inner seal 228 is positioned between the blind plug 222 and the choke insert 228 and an outer seal 230 is positioned between the choke insert and the cross connector 42. The inner and outer seals 228, 230 may be similar to the seal member 76 described above. In addition, and the wing union nut 226 may include a vent port 232 to release trapped pressure.

Figure 17:
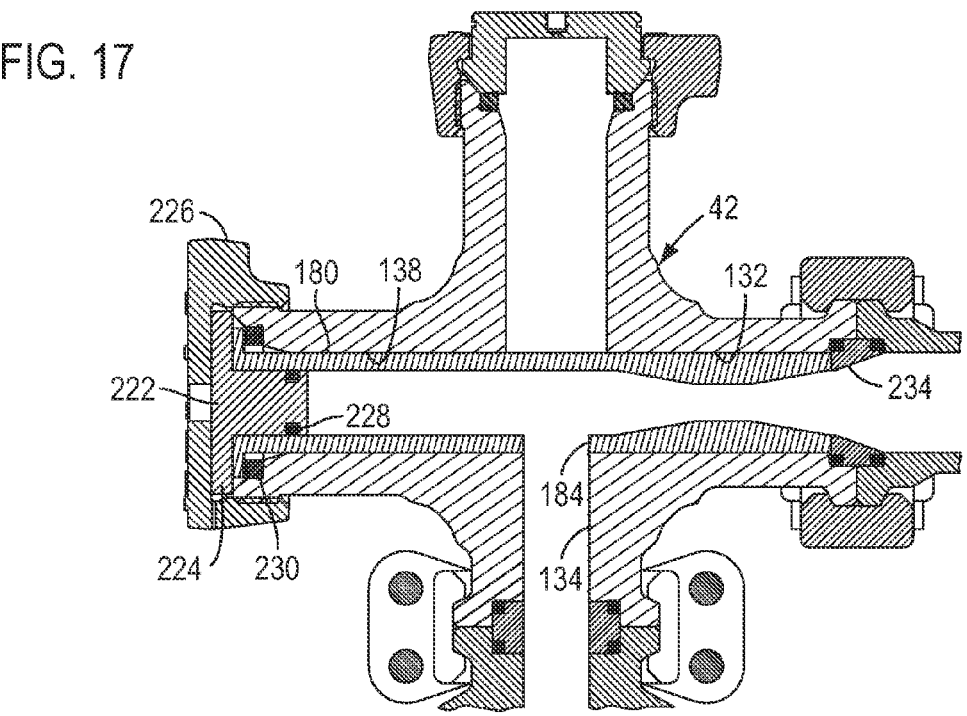

The embodiment shown in FIG. 17 is similar to that shown in FIG. 16; however, in this embodiment the choke insert 180 is positioned in the inlet port 132 with the side opening 184 in alignment with the outlet port 134 and the blind plug 222 positioned at the opening of the side port 138. In addition, the bottom or right end of the choke insert 180 is retained by a seal assembly 234 similar to the seal assembly 198 described above in connection with FIG. 11.

Figure 18:
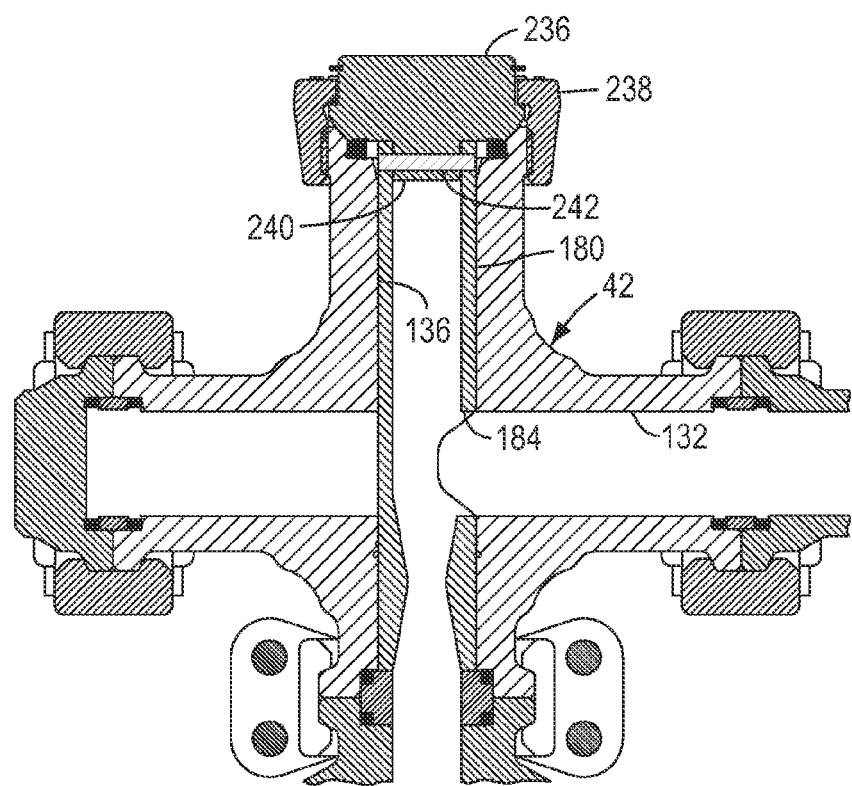

In the embodiment shown in FIG. 18, the top port 136 is closed by a plug 236 which is secured to the cross connector 42 by a wing union nut 238. The plug 236 includes a reduced diameter bottom portion 240 which is received in the top of the choke insert 180 and is secured thereto with a pin 242.

The manifold trailer 10 may be provided with means for supporting the arm assemblies 36 on the chassis 12. Referring again to FIGS. 1A and 1B, for example, each lateral pair of arm assemblies 36 is supported on the chassis 12 with a corresponding brace member 244. Each brace member 244 includes a support 246 which is connected to the chassis 12 (or another component which in turn is connected to the chassis) by suitable means, such as welding, and a transverse cross bar 248 which is connected to the top of the support. Each end of the cross bar 248 is connected to a corresponding arm assembly 36 with, for example, a collar 250 that is bolted to either the female swivel part 70 or the portion of the cross connector 42 through which the top port 136 extends. In addition, a beam member 252 may be connected to successive cross bars 248 in order to provide longitudinal stability to the brace members 244.

Thus, it may be seen that the arm assemblies 36 are connected to and supported by the manifold trailer 10 at all times. Consequently, separate conduit assemblies are not required to be transported from location to location independently of the manifold trailer 10. In addition, when setting up for well servicing operations, separate conduit assemblies do not need to be connected between the high pressure pumping units and the main lines 26. Instead, with the manifold trailer 10 of the present invention the main lines 26 can be connected to the high pressure pumping units by simply extending the outer arm 48 of each arm assembly 36 to a corresponding pumping unit.

Each arm assembly 36 may comprise means for supporting the inner arm 44 in a generally horizontal position and for reducing the bending and torsional loads acting on the connector 104 between the inner arm and the first swivel joint 46. Referring to FIGS. 2 and 3, for example, each arm assembly 36 may comprise a diagonal brace 254 which extends between a collar 256 that is bolted or otherwise connected to the female swivel part 70 and a sleeve 258 that is bolted or otherwise connected to the inner arm 44. At least the upper half of the sleeve 258 extends along the inner arm 44 and is coupled to the first swivel joint 46 with a generally V-shaped bracket 260. The bracket 260 includes a first end 262 which is bolted or otherwise connected to the sleeve 258 and a second end 264 which is secured with a U bolt 266 or other suitable means to the upper elbow 268 of the swivel joint 46. The second end 264 comprises a diagonal first plate 270 which includes a semi-circular cutout that engages the underside of approximately the middle of the elbow 268 and a horizontal second plate 272 which includes a semi-circular cutout that engages the distal end portion of the elbow. Thus, the brace 254 supports the inner arm 44 in a generally horizontal position, while the bracket 260, and in particular the engagement of the first and second plates 270, 272 with the elbow 266, transfers the bending and torsional loads acting on the first swivel joint 46 to the inner arm 44, thereby preventing these loads from acting on the connector 104, which could otherwise cause the connector to become loose.

Each arm assembly 36 may also include means for counterbalancing the weight of the outer arm 48 as it is being deployed. Referring to FIG. 2, for example, each arm assembly 36 may include a counterbalance hydraulic cylinder 274 which is secured between the first swivel joint 46 and the outer arm 48. The cylinder 274 has a first end which is rotatably connected to a bridge plate 276 that is clamped or otherwise connected to the outer arm 48. The second end of the cylinder 274 is rotatably connected to a generally horizontally-extending bracket 278 that is clamped or otherwise connected to the horizontal swivel part 280 of the first swivel joint 46. The bracket 278 may be supported by a vertical plate 282 which is connected to the middle elbow 284 of the first swivel joint 46 with a U bolt 286 or other suitable means. The cylinder 274 may comprise a simple fluid filled or spring cylinder. Alternatively, cylinder 274 may comprise a hydraulic cylinder whose pressure is controlled to provide a constant counterbalance force to the outer arm 48.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. A manifold trailer which comprises at least one main line having a plurality of discharge connectors and a plurality of articulating arm assemblies which are each connected to a corresponding discharge connector, each arm assembly comprising:
   a connector member which includes at least an inlet port, an outlet port and a third port which is located generally opposite the outlet port and is closed by a removable plug member;
   an articulating conduit assembly which comprises a first end that is connected to the inlet port; and
   a riser swivel which is connected to the outlet port;
   wherein a second end of the conduit assembly is connectable to a pumping unit to thereby fluidly connect the pumping unit to the main line.

2. The manifold trailer of claim 1, wherein the third port is positioned vertically above the inlet and outlet ports.

3. The manifold trailer of claim 2, wherein the third port is positioned vertically above the conduit assembly when the second end is connected to the pumping unit.

4. The manifold trailer of claim 1, further comprising a choke insert which is positioned in the outlet port and is removable through the third port.

5. The manifold trailer of claim 4, wherein the choke insert is positioned in a counterbore formed in the outlet port.

6. The manifold trailer of claim 4, wherein the choke insert is supported on a seal assembly which is positioned between the connector member and the riser swivel.

7. The manifold trailer of claim 6, wherein the seal assembly comprises a bushing which projects radially into the outlet port and on which the choke insert is supported.

8. The manifold trailer of claim 4, wherein the choke insert extends through the third port to the plug member.

9. The manifold trailer of claim 8, wherein the choke insert includes a transverse pull bar which is located proximate the plug member.

10. The combination manifold trailer of claim 8, wherein the choke insert is connected to the plug member.

11. The combination manifold trailer of claim 8, wherein the choke insert includes at least one inlet opening and the arm assembly further comprises means for aligning the inlet opening with the inlet port.

12. The combination manifold trailer of claim 11, wherein the aligning means comprises an alignment pin which is received in opposing holes in the plug member and the connector member when the inlet opening is aligned with the inlet port.

13. The manifold trailer of claim 11, wherein the connector member comprises a fourth port which is located generally opposite the inlet port and the aligning means comprises a locator pin which is positioned in the fourth port and which includes an axial projection that is received in a corresponding hole in the choke insert when the inlet opening is aligned with the inlet port.

14. The manifold trailer of claim 8, wherein the plug member comprises a blind nut and the choke insert comprises a radial flange which is trapped between the blind nut and an adjacent portion of the connector member to thereby secure the choke insert within the connector member.

15. The manifold trailer of claim 14, further comprising a first seal which is positioned between the flange and the blind nut and a second seal which is positioned between the flange and the adjacent portion of the connector member.

16. The manifold trailer of claim 8, wherein the plug member comprises a blind plug which extends into the choke insert and is secured to the connector member by a nut.

17. The manifold trailer of claim 1, wherein the connector member comprises a fourth port which is located generally opposite the inlet port and is closed by a second removable plug member.

18. The manifold trader of claim 17, wherein the connector member is configured such that each of the inlet port and the fourth port is connectable to the conduit assembly.

19. The manifold trailer of claim 17, further comprising a choke insert which is positioned in the inlet port and is removable through the fourth port.

20. The manifold trailer of claim 19, wherein the choke insert is positioned in a counterbore formed in the inlet port.

21. The manifold trailer of claim 19, wherein the choke insert is supported against a seal assembly which is positioned between the connector member and the conduit assembly.

22. The combination manifold trailer of claim 21, wherein the seal assembly comprises a bushing which projects radially into the inlet port and against which the choke insert is supported.

23. The manifold trailer of claim 19, wherein the choke insert extends through the fourth port to the second plug member.

24. The manifold trailer of claim 23, wherein the choke insert includes a transverse pull bar which is located proximate the second plug member.

25. The manifold trailer of claim 23, wherein the choke insert is connected to the second plug member.

26. The manifold trailer of claim 23, wherein the second plug member comprises a blind nut and the choke insert comprises a radial flange which is trapped between the blind nut and an adjacent portion of the connector member to thereby secure the choke insert within the connector member.

27. The manifold trailer of claim 26, further comprising a first seal which is positioned between the flange and the blind nut and a second seal which is positioned between the flange and the adjacent portion of the connector member.

28. The combination manifold trailer of claim 23, wherein the second plug member comprises a blind plug which extends into the choke insert and is secured to the connector member by a nut.

29. The manifold trailer of claim 4, wherein:
the choke insert includes a choke orifice which comprises an exit opening diameter at an end of the choke orifice adjacent the riser swivel;
the riser swivel includes a male swivel part which comprises a male swivel bore and a female swivel part which comprises a female swivel bore; and
the diameter of at least one of the male swivel bore and the female swivel bore increases from a first diameter approximately equal to the exit opening diameter to a second, larger diameter to thereby create a pressure drop in a fluid flowing through the riser swivel.

30. The manifold trailer of claim 4, wherein:
the choke insert includes a choke orifice which comprises an exit opening diameter at an end of the choke orifice adjacent the riser swivel;
the riser swivel includes a male swivel part which comprises a male swivel bore and a female swivel part which comprises a female swivel bore;
the female swivel part is located adjacent the choke insert;
the diameter of the female swivel bore increases from a first diameter approximately equal to the exit opening diameter to a second, larger diameter; and
the diameter of the male swivel bore is approximately equal to the second diameter.

31. The manifold trailer of claim 4, wherein:
the choke insert includes a choke orifice which comprises an exit opening diameter at an end of the choke orifice adjacent the riser swivel;
the riser swivel includes a male swivel part which comprises a male swivel bore and a female swivel part which comprises a female swivel bore;
the female swivel part is located adjacent the choke insert;
the diameter of the female swivel bore is approximately equal to the exit opening diameter; and
the diameter of the male swivel bore increases from a first diameter approximately equal to the exit opening diameter to a second, larger diameter.

32. The manifold trader of claim 4, wherein the riser swivel is connected to an isolation valve which in turn is connected to the discharge connector.

33. The combination manifold trailer of claim 32, wherein:
the choke insert includes a choke orifice which comprises an exit opening diameter at an end of the choke orifice adjacent the riser swivel;
the riser swivel includes a male swivel part which comprises a male swivel bore and a female swivel part which comprises a female swivel bore;
the diameter of the male swivel bore is approximately equal to the exit opening diameter;
the diameter of the female swivel bore is approximately equal to the exit opening diameter; and
the isolation valve includes a valve bore which comprises a diameter that increases from a first diameter approximately equal to the exit opening diameter to a second, larger diameter.

34. The manifold trailer of claim 32, wherein:
the choke insert includes a choke orifice which comprises an exit opening diameter at an end of the choke orifice adjacent the riser swivel;
the isolation valve includes a valve bore and a closure member which is positioned across the valve bore;

the valve bore comprises a diameter which is larger than the exit opening diameter; and the closure member includes a closure member bore which comprises an orifice having a diameter which is approximately equal to the exit opening diameter.

* * * * *